(12) United States Patent
Yui et al.

(10) Patent No.: US 12,017,424 B2
(45) Date of Patent: Jun. 25, 2024

(54) FITTING METHOD AND REPAIR METHOD

(71) Applicant: MITSUBISHI HEAVY INDUSTRIES, LTD., Tokyo (JP)

(72) Inventors: Yuichi Yui, Tokyo (JP); Akihiro Terasaka, Tokyo (JP); Kenji Wada, Tokyo (JP); Yoshifusa Tobata, Tokyo (JP); Koichi Hasegawa, Tokyo (JP); Yasunobu Ishida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 354 days.

(21) Appl. No.: 17/437,985

(22) PCT Filed: Feb. 28, 2020

(86) PCT No.: PCT/JP2020/008295
§ 371 (c)(1),
(2) Date: Sep. 10, 2021

(87) PCT Pub. No.: WO2020/184217
PCT Pub. Date: Sep. 17, 2020

(65) Prior Publication Data
US 2022/0176659 A1 Jun. 9, 2022

(30) Foreign Application Priority Data
Mar. 14, 2019 (JP) .................................. 2019-047740

(51) Int. Cl.
*B29C 73/10* (2006.01)
(52) U.S. Cl.
CPC .................................. *B29C 73/10* (2013.01)

(58) Field of Classification Search
CPC ..... B32B 15/08; B32B 2250/02; B32B 27/00; B32B 3/00; B32B 7/04; B32B 7/12; B29C 65/48; B29C 65/4815; B29C 65/78; B29C 66/73751
See application file for complete search history.

(56) References Cited

U.S. PATENT DOCUMENTS

| | | | | |
|---|---|---|---|---|
| 2014/0141190 A1* | 5/2014 | Shigetomi | ................. | B64F 5/40 428/63 |
| 2014/0238579 A1* | 8/2014 | Dan-Jumbo | .............. | B64F 5/40 156/94 |
| 2018/0264759 A1* | 9/2018 | Garhart | .................... | B64F 5/00 |

FOREIGN PATENT DOCUMENTS

JP 2009148952 A 7/2009

* cited by examiner

*Primary Examiner* — Vishal I Patel
(74) *Attorney, Agent, or Firm* — HAUPTMAN HAM, LLP

(57) ABSTRACT

A fitting method is for fitting a material to be repaired and a repair patch to be adhesively bonded to the material at adhesive surfaces, each adhesive surface having at least two or more of curved portions. The fitting method includes measuring a shape of the material; measuring a shape of the repair patch; dividing repair patch shape measurement data acquired at measuring the shape of repair patch into pieces of divided data each including one or less of the curved portions; performing, at the adhesive surfaces, fitting processing of the pieces of divided data acquired at dividing the repair patch shape measurement data to material-to-be-repaired shape measurement data acquired at measuring the shape of material; and calculating a gap amount between the material-to-be-repaired shape measurement data and repair patch shape fitting data acquired from the fitting processing at the adhesive surfaces.

4 Claims, 5 Drawing Sheets

FITTING METHOD AND REPAIR METHOD

RELATED APPLICATIONS

The present application is a National Phase of International Application Number PCT/JP2020/008295 filed Feb. 28, 2020 and claims priority of Japanese Application Number 2019-047740 filed Mar. 14, 2019.

FIELD

The present invention relates to a fitting method and a repair method.

BACKGROUND

As a method of repairing a material to be repaired, a method is known in which a repair patch is disposed on a portion to be repaired of a material to be repaired, the repair patch is heated while being pressed, and then the repair patch is fixed to the portion to be repaired of the material to be repaired (refer to Patent Literature 1).

CITATION LIST

Patent Literature

Patent Literature 1: Japanese Patent Application Laid-open No. 2009-148952

SUMMARY

Technical Problem

For the method described in Patent Literature 1, it is difficult that the material to be repaired and the repair patch completely coincide with each other at their adhesive surfaces depending on materials constituting the material to be repaired and the repair patch, the shapes of the adhesive surfaces of the material to be repaired and the repair patch, and the like. For this reason, shape measurement data of the material to be repaired and shape measurement data of the repair patch are subjected to computation processing of fitting at the adhesive surfaces to estimate a gap amount between the material to be repaired and the repair patch at the adhesive surfaces, an adhesive is disposed based on the estimated gap amount, and the repair patch is adhesively bonded to the material to be repaired without a gap at the adhesive surfaces as much as possible.

Particularly, when the adhesive surfaces have curved portions, the shape of the repair patch may have a significant shift from the shape of the portion to be repaired of the material to be repaired due to expansion and contraction of the repair patch formed by being fitted to the shape of the portion to be repaired of the material to be repaired, for example. Specifically, a portion corresponding to the curved portion in the shape of the repair patch may be deformed in such a direction that the curvature is further increased. When the adhesive surfaces have at least two or more of the curved portions, a phenomenon called spring-in may occur. In the phenomenon, the portions corresponding to the curved portions of the repair patch are deformed into the inside of the shape of the portion to be repaired of the material to be repaired.

FIG. 6 is a schematic cross-sectional view illustrating an example when material-to-be-repaired shape measurement data 201 and repair patch shape measurement data 202 according to a conventional technique are fitted at adhesive surfaces. With reference to FIG. 6, the following describes a problem to be solved in fitting of the material-to-be-repaired shape measurement data 201 and the repair patch shape measurement data 202 according to the conventional technique at the adhesive surfaces.

In FIG. 6, the material-to-be-repaired shape measurement data 201 is based on the shape measurement data of the material to be repaired when its adhesive surface has four curved portions having concave, convex, convex, and concave shapes with respect to the upper direction in FIG. 6 in this order. In FIG. 6, the repair patch shape measurement data 202 is obtained by performing fitting on the material-to-be-repaired shape measurement data 201 at the adhesive surfaces based on the shape measurement data of the repair patch when its adhesive surface has four curved portions having concave, convex, convex, and concave shapes with respect to the upper direction in FIG. 6 in this order. As illustrated in FIG. 6, due to a spring-in phenomenon occurring in the shape of the repair patch, there is a penetration phenomenon of portions 202a and 202b corresponding to the concave shaped curved portions of the repair patch shape measurement data 202 penetrating the material-to-be-repaired shape measurement data 201. As described above, a problem arises in that it is difficult to perform fitting normally, at the adhesive surfaces, between the material-to-be-repaired shape measurement data 201 and the repair patch shape measurement data 202 according to the conventional technique when the adhesive surfaces each have at least two or more of the curved portions.

The present invention has been made in view of the foregoing, and an object of the present invention is to provide a fitting method and a repair method that enable fitting of a material to be repaired and a repair patch to be normally performed at adhesive surfaces even when the adhesive surfaces of the material to be repaired and the repair patch each have at least two or more of curved portions.

Solution to Problem

In order to solve the problems described above and achieve the object, a fitting method is for fitting a material to be repaired and a repair patch to be adhesively bonded to the material to be repaired at adhesive surfaces where the material to be repaired and the repair patch are adhesively bonded, each adhesive surface having at least two or more of curved portions. The fitting method includes a step of measuring shape of material to be repaired for measuring a shape of the material to be repaired; a step of measuring shape of repair patch for measuring a shape of the repair patch; a step of dividing repair patch shape measurement data for dividing repair patch shape measurement data acquired at the step of measuring shape of repair patch into a plurality of pieces of divided data each including one or less of the curved portions; a step of fitting for performing, at the adhesive surfaces, fitting processing of the pieces of divided data acquired at the step of dividing repair patch shape measurement data to material-to-be-repaired shape measurement data acquired at the step of measuring shape of material to be repaired; and a step of calculating gap amount for calculating a gap amount between the material-to-be-repaired shape measurement data and repair patch shape fitting data acquired from the fitting processing performed at the step of fitting at the adhesive surfaces.

With this configuration, the repair patch shape measurement data that is fitted to the material-to-be-repaired shape measurement data is divided into the pieces of divided data each including one or less of the curved portions, thereby increasing a degree of freedom of fitting and making it possible to reduce possibility of the occurrence of a penetration phenomenon occurring when two or more of the curved portions are included. Therefore, it is possible to normally fit the material to be repaired and the repair patch at the adhesive surfaces even when the adhesive surfaces of the material to be repaired and the repair patch each have at least two or more of the curved portions.

In this configuration, it is preferable that, at the step of dividing repair patch shape measurement data, two pieces of the divided data share a major fitting planar portion that is a planar portion where the material to be repaired and the repair patch are actually fitted with a gap amount equal to or smaller than a certain amount. This configuration makes it possible to perform fitting of the material to be repaired and the repair patch at the adhesive surfaces with a high accuracy in accordance with an actual system.

In this configuration, it is preferable that a step of calculating adhesive addition amount for calculating an additional amount of an adhesive additionally disposed on the adhesive surfaces based on the gap amount calculated at the step of calculating gap amount is further included. This configuration makes it possible to suitably provide the information about the additional amount of the adhesive directly necessary for repairing of the material to be repaired performed by actually adhesively bonding the repair patch to the material to be repaired.

In order to solve the problems described above and achieve the object, a repair method is for repairing a material to be repaired by adhesively bonding a repair patch to the material to be repaired. The repair method includes a step of machining material to be repaired for machining an adhesive surface of the material to be repaired; a step of forming repair patch for forming the repair patch to coincide with the adhesive surface of the material to be repaired; a step of processing fitting computation based on any one of the above-described fitting methods; and a step of adhesively bonding repair patch for adhesively bonding the repair patch to the material to be repaired based on the gap amount calculated at the step of processing fitting computation.

With this configuration, the repair patch shape measurement data that is fitted to the material-to-be-repaired shape measurement data is divided into the pieces of divided data each including one or less of the curved portions, thereby increasing a degree of freedom of fitting and making it possible to reduce possibility of the occurrence of the penetration phenomenon occurring when two or more of the curved portions are included. Therefore, it is possible to normally fit the material to be repaired and the repair patch at the adhesive surfaces even when the adhesive surfaces of the material to be repaired and the repair patch each have at least two or more of the curved portions. Accordingly, it is possible to more suitably adhesively bond the repair patch to the material to be repaired to repair the material to be repaired.

Advantageous Effects of Invention

The invention can provide the fitting method and the repair method that enable the material to be repaired and the repair patch to be normally fitted at the adhesive surfaces even when the adhesive surfaces of the material to be repaired and the repair patch each have at least two or more of the curved portions.

DESCRIPTION OF EMBODIMENT

The following describes an embodiment according to the present invention in detail with reference to the accompanying drawings. The embodiment does not limit this invention. The constituent elements described in the following embodiment include those easily envisaged by those skilled in the art and substantially identical ones. The constituent elements described below can be combined as appropriate.

EMBODIMENT

Figure 1:
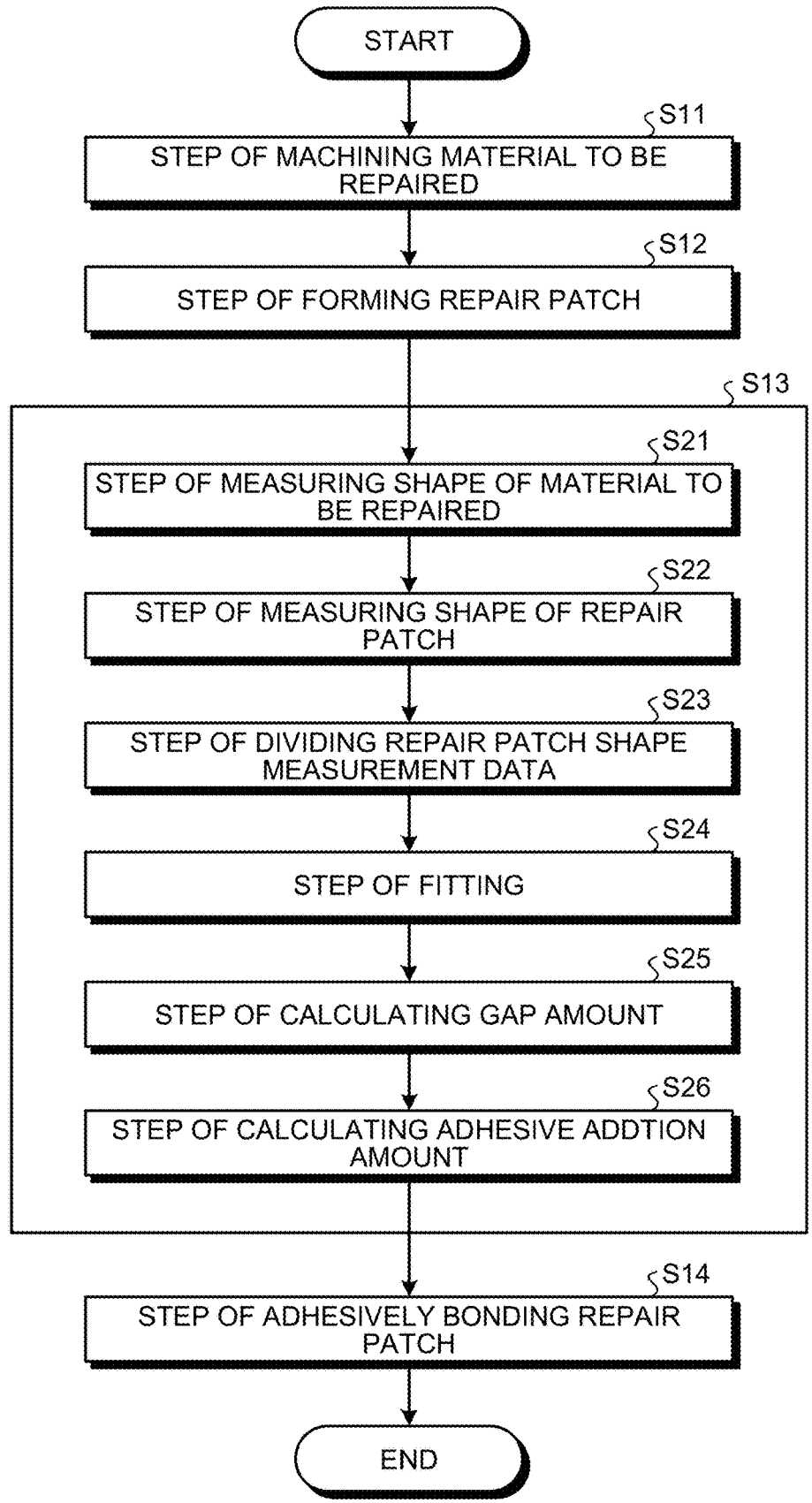
FIG. 1 is a flowchart illustrating a repair method that includes a fitting method according to an embodiment of the invention.

FIG. 1 is a flowchart illustrating a repair method that includes a fitting method according to the embodiment of the present invention. As illustrated in FIG. 1, the repair method according to the embodiment has a step of machining material to be repaired S11, a step of forming repair patch S12, a step of processing fitting computation S13 based on the fitting method according to the embodiment of the present invention, and a step of adhesively bonding repair patch S14.

Figure 2:
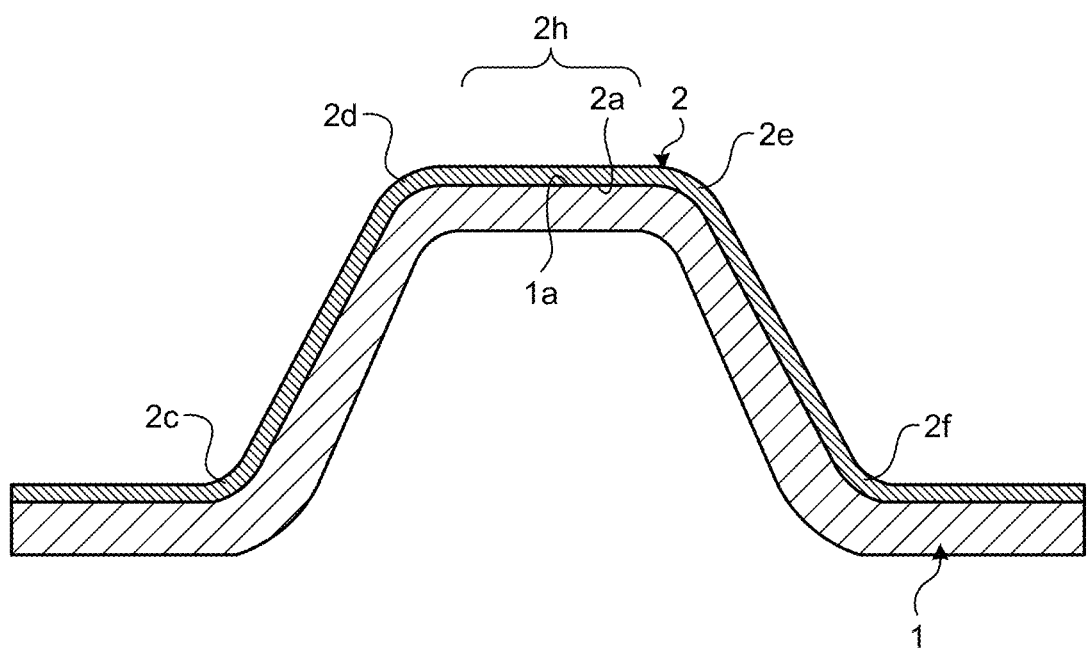
FIG. 2 is a schematic cross-sectional view explaining a step of machining material to be repaired and a step of forming repair patch in FIG. 1.

FIG. 2 is a schematic cross-sectional view explaining the step of machining material to be repaired S11 and the step of forming repair patch S12 in FIG. 1. The repair method according to the embodiment repairs a material to be repaired 1 by adhesively bonds an adhesive surface 2a of a repair patch 2 to an adhesive surface 1a of the material to be repaired 1 serving as a mother material. At the step of machining material to be repaired S11, the adhesive surface 1a of the material to be repaired 1 is machined as illustrated in FIG. 2. Specifically, at the step of machining material to be repaired S11, a damaged portion of the material to be repaired 1, the damaged portion being needed to be repaired by the repair patch 2, is removed by physical machining such as grinding and polishing to form a portion to be repaired of the material to be repaired 1 and the adhesive surface 1a that allows the repair patch 2 to be adhesively bonded.

At the step of forming repair patch S12, the repair patch 2 is formed to coincide with the adhesive surface 1a of the material to be repaired 1. Specifically, at the step of forming repair patch S12, a material constituting the repair patch 2 is disposed along the adhesive surface 1a of the material to be repaired 1 and the repair patch 2 is heated while being pressed to be formed as the repair patch 2. The adhesive surface 2a is the surface of the repair patch 2 formed at the step of forming repair patch S12 and faces along the adhesive surface 1a of the material to be repaired 1.

The adhesive surface 1a of the material to be repaired 1 and the adhesive surface 2a of the repair patch 2, which are subjected to the repair method including the fitting method according to the embodiment of the present invention, each have at least two or more of curved portions. In the present specification, the curved portion is defined as a portion having a curvature equal to or larger than one sixth of the scale of the repair patch 2 while a planar portion, which is not the curved portion, is defined as a portion having a curvature smaller than one sixth of the scale of the repair patch 2. In the present embodiment, the portion having a curvature smaller than one sixth of the scale of the repair patch 2 is handled as the planar portion, and is subjected to fitting processing and the like. The adhesive surface 1a of the material to be repaired 1 and the adhesive surface 2a of the repair patch 2, specifically, each have four curved portions having concave, convex, convex, and concave shapes with respect to the upper direction in FIG. 2 in this order from the left side. In the repair patch 2, the portions corresponding to the four curved portions of the adhesive surface 2a are each called a curved portion 2c, a curved portion 2d, a curved portion 2e, and a curved portion 2f, in this order from the left side. In the repair patch 2, the planar portion between the curved portions 2d and 2e is called a major fitting planar portion 2h, which is the planar portion in which the adhesive surface 1a of the material to be repaired 1 and the adhesive surface 2a of the repair patch 2 are actually fitted with a gap amount equal to or smaller than a certain amount.

The repair patch 2 is preferably made of the same material as the material to be repaired 1 because the repair patch 2 is used for repairing the material to be repaired 1. The material to be repaired 1 and the repair patch 2 are preferably made of a material that can be formed by being pressed and heated. The material to be repaired 1 and the repair patch 2 that are made of a material having high possibility of the occurrence of a spring-in phenomenon can more remarkably obtain a large working effect by the repair method including the fitting method according to the embodiment of the present invention. The material to be repaired 1 and the repair patch 2 are preferably made of a composite material containing reinforced fibers and a resin that can be formed by being pressed and heated and has high possibility of the occurrence of the spring-in phenomenon.

When the material to be repaired 1 and the repair patch 2 are made of the composite material, examples of the reinforced fibers contained in the composite material include carbon fibers, metallic fibers, glass fibers, and plastic fibers each having bundles of several hundreds to several thousands of basic fibers in a range between 5 μm and 7 μm inclusive. When the material to be repaired 1 and the repair patch 2 are made of the composite material, the reinforced fibers may be impregnated with a resin, or a commingled material may be used that are mixture of reinforced fibers and resin fibers. The commingled material includes a commingled material in which reinforced fibers and resin fibers are woven in a knit shape.

When the material to be repaired 1 and the repair patch 2 are made of the composite material, examples of the resin contained in the composite material include thermosetting resins that change, by being heated, from a softened state or a semi-hardened state to a hardened state by a thermosetting reaction, and thermoplastic resins that perform a heat melting reaction by being heated. In the following description, as for the resin contained in the composite material when the material to be repaired 1 and the repair patch 2 are made of the composite material, the thermosetting reaction of the thermosetting resin and the heat melting reaction of the thermoplastic resin are each simply described as the reaction in a case where the thermosetting resin and the thermoplastic resin do not need to be differentiated from each other.

When the material to be repaired 1 and the repair patch 2 are made of the composite material and the resin contained in the composite material is the thermosetting resin, a resin having an epoxy resin is exemplified as the resin. When the material to be repaired 1 and the repair patch 2 are made of the composite material and the resin contained in the composite material having an epoxy resin, the resin having an epoxy resin is preferable because the material to be repaired 1 and the repair patch 2 have lighter weights and higher strengths. When the material 1 and the repair patch 2 are made of the composite material and the resin contained in the composite material is the thermosetting resin, other examples of the resin include polyester resins and vinyl ester resins. When the material 1 and the repair patch 2 are made of the composite material and the resin contained in the composite material is the thermoplastic resin, examples of the resin include polyamide resins, polypropylene resins, acrylonitrile butadiene styrene (ABS) resins, poly ether ether ketone (PEEK), poly ether ketone ketone (PEKK), and poly phenylene sulfide (PPS). The resin contained in the composite material when the material 1 and the repair patch 2 are made of the composite material is not limited to those examples. The resin may be other resins.

When the material to be repaired 1 and the repair patch 2 are made of the composite material, the composite material before the reaction of the resin is a prepreg of the composite material, for example, in the present embodiment. The composite material after the reaction of the resin has a light weight and a high strength.

At the step of forming repair patch S12, when the material to be repaired 1 and the repair patch 2 are made of the composite material, the repair patch 2 is preferably formed by heating the repair patch 2 to react the resin while being pressed under pressures between 0 kPa and 800 kPa inclusive (0 kPa is a case where the repair patch 2 is not pressed). The repair patch 2 is more preferably formed by heating the repair patch 2 to react the resin while being pressed under pressures between 300 kPa and 600 kPa inclusive. At the step of forming repair patch S12, when the material to be repaired 1 and the repair patch 2 are made of the composite material, the heating temperature to form the repair patch 2 is preferably determined as appropriate in accordance with the reaction temperature of the resin.

At the step of forming repair patch S12, the shape of the formed repair patch 2 has a significant shift from the shape of the portion to be repaired of the material to be repaired 1 due to expansion and contraction of the material constituting the repair patch 2 and the like in some cases. When the material constituting the repair patch 2 is the composite material, the significant shift tends to be more increased. Specifically, at the step of forming repair patch S12, the portions corresponding to the curved portions 2c, 2d, 2e, and 2f of the shape of the formed repair patch 2 tend to be deformed in such a direction that the curvatures are further increased.

The step of processing fitting computation S13 based on the fitting method according to the embodiment of the present invention is performed to estimate a possible influence caused by the significant shift possibly occurring in the shape of the repair patch 2 formed at the step of forming repair patch S12 in adhesively boding of the repair patch 2 to the material to be repaired 1. Specifically, the material to be repaired 1 and the repair patch 2 are fitted at the adhesive surfaces 1a and 2a where the material to be repaired 1 and the repair patch 2 are adhesively bonded. More specifically, as illustrated in FIG. 1, the step of processing fitting computation S13 has a step of measuring shape of material to be repaired S21, a step of measuring shape of repair patch S22, a step of dividing repair patch shape measurement data S23, a step of fitting S24, a step of calculating gap amount S25, and a step of calculating adhesive addition amount S26.

Figure 3:
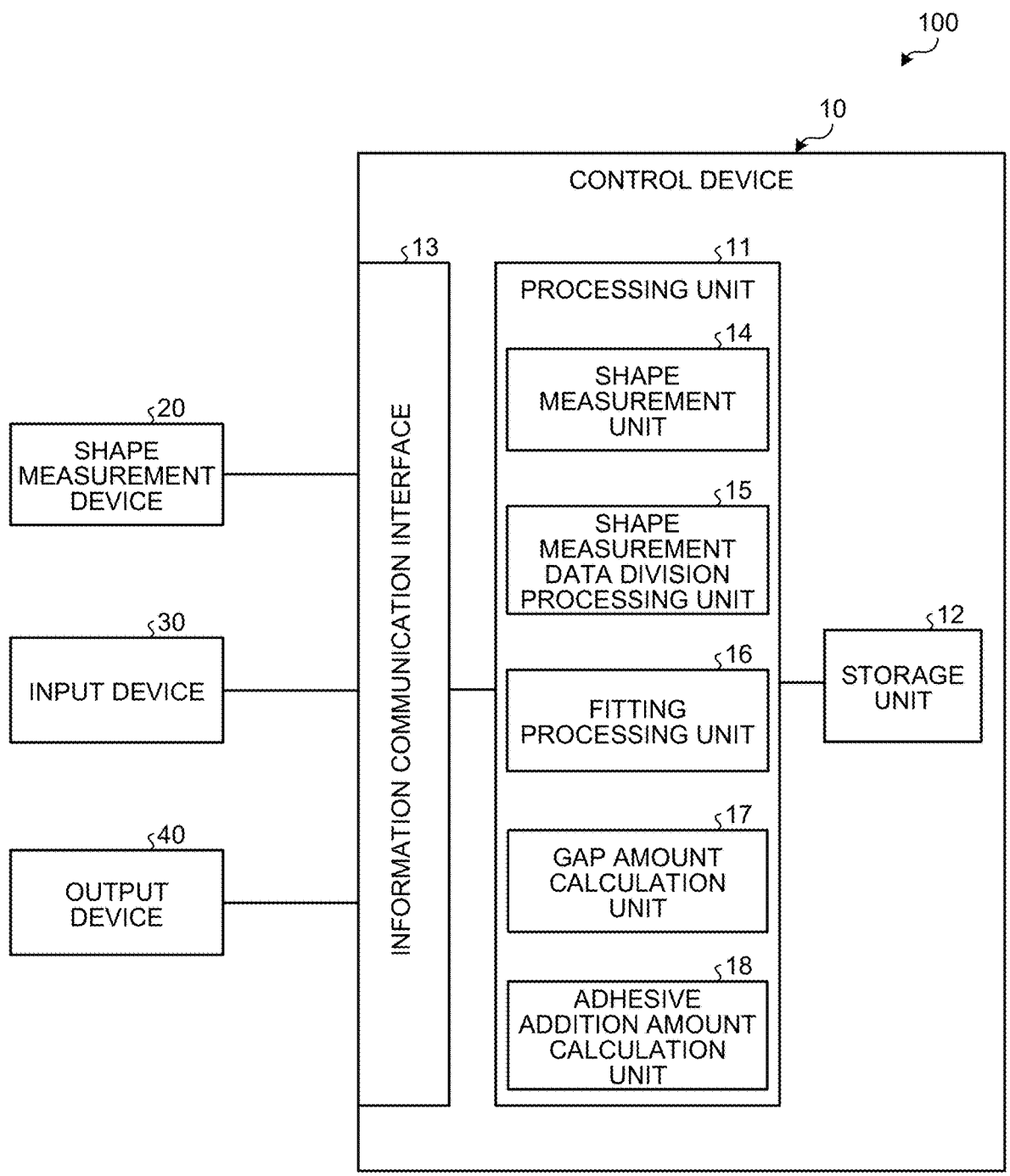
FIG. 3 is a functional block diagram illustrating a fitting computation processing system that performs a step of processing fitting computation based on the fitting method in FIG. 1.

FIG. 3 is a functional block diagram illustrating a fitting computation processing system 100 that performs the step of processing fitting computation S13 based on the fitting method in FIG. 1. As illustrated in FIG. 3, the fitting computation processing system 100 includes a control device 10, a shape measurement device 20, an input device 30, and an output device 40.

The control device 10, which is electrically connected to the shape measurement device 20, the input device 30, and the output device 40, controls the operations of these devices. The shape measurement device 20 measures the shape of the material to be repaired 1, the shape including the shape of the adhesive surface 1a of the material to be repaired 1, when the material to be repaired 1 is placed in a measurement space of the shape measurement device 20, and acquires material-to-be-repaired shape measurement data 101 (refer to FIG. 4), which is described later. The shape measurement device 20 measures the shape of the repair patch 2, the shape including the shape of the adhesive surface 2a of the repair patch 2, when the repair patch 2 is placed in the measurement space of the shape measurement device 20, and acquires repair patch shape measurement data 102 (refer to FIG. 4), which is described later. For the shape measurement device 20, a known three-dimensional measuring machine is suitably used that can three-dimensionally measure an object that has three dimensions and is placed in the measurement space of the shape measurement device 20.

The input device 30 is an information processing terminal such as a mobile phone including an intelligent mobile phone (what is called a smartphone), a tablet terminal, a notebook or desktop personal computer (PC), a personal digital assistant (PDA) serving as a portable information terminal, and an eyeglass type or a wrist watch type wearable device.

The input device 30 has functions to input various types of information necessary when the control device 10 performs various types of computation processing related to the step of processing fitting computation S13 based on the fitting method according to the embodiment. For example, the input device 30 has a function to display an input screen on a display unit of the input device 30 for receiving input of various types of information transmitted from the control device 10, and a function to transmit the received input various types of information to the control device 10. The input device 30 implements those various functions by executing software or applications for use of the control device 10 or Internet browser functions for use of the control device 10.

The output device 40 displays characters, images, movies, and the like based on the received information. The output device 40 has functions to output output information obtained as results of the various types of computation processing performed by the control device 10 related to the step of processing fitting computation S13 based on the fitting method according to the embodiment. For example, the output device 40 has a function to receive output information output from the control device 10, and a function to display, on a display unit of the output device 40, output screens and the like based on the output information. The output device 40 implements those various functions by executing the software or applications for use of the control device 10 or the Internet browser functions for use of the control device 10.

In the present embodiment, the fitting computation processing system 100 includes the input device 30 and the output device 40 that are provided separately. The present invention is, however, not limited to this configuration. The input device 30 and the output device 40 may be integrated. In this case, the display unit of the input device 30 functions as the output device 40, for example.

The control device 10 is an information processing device that includes a computer system controlling the fitting computation processing system 100. As illustrated in FIG. 3, the control device 10 has a processing unit 11, a storage unit 12, and an information communication interface 13.

The processing unit 11, which is a controller, is implemented as follows: a central processing unit (CPU), a micro processing unit (MPU), or the like executes various computer programs (corresponding to an example of a fitting program or a repair program) stored in the storage unit 12, which is a storage device inside the control device 10, using the RAM as a working area, for example. The processing unit 11, which is the controller, is implemented by an integrated circuit such as an application specific integrated circuit (ASIC) or a field programmable gate array (FPGA), for example. The processing unit 11 is connected to the information communication interface 13 that receives input of information from the shape measurement device 20 and the input device 30, and outputs, to the output device 40 electrically connected to the control device 10, information such as various parameters about the fitting computation processing system 100, measurement results, and calculation results.

As illustrated in FIG. 3, the processing unit 11 is electrically connected to the storage unit 12 and the information communication interface 13 such that mutual information communication can be made, and functions as the control unit that controls the constituent elements of each of the storage unit 12 and the information communication interface 13. The processing unit 11 functions as the control unit together with the storage unit 12 to cause the fitting computation processing system 100 to perform the step of processing fitting computation S13 based on the fitting method according to the embodiment of the present invention.

As illustrated in FIG. 3, the processing unit 11 has a shape measurement unit 14, a shape measurement data division processing unit 15, a fitting processing unit 16, a gap amount calculation unit 17, and an adhesive addition amount calculation unit 18. The units included in the processing unit 11, i.e., the shape measurement unit 14, the shape measurement data division processing unit 15, the fitting processing unit 16, the gap amount calculation unit 17, and the adhesive addition amount calculation unit 18, are function units each of which is implemented as a result of the processing unit 11 executing the fitting program or the repair program. The specific functions of the units included in the processing unit 11 are explained together with the detailed explanation of the step of processing fitting computation S13 based on the fitting method according to the embodiment.

The storage unit 12 is implemented by a semiconductor memory element such as a read only memory (ROM), a random access memory (RAM), or a flash memory, or a storage device such as a hard disk or an optical disc, for example. The storage unit 12 stores therein various types of output processing information necessary for generation processing of control signals for controlling the devices in the fitting computation processing system 100, and various types of input processing information necessary for analysis processing of received signals obtained from the devices in the fitting computation processing system 100. The storage unit 12 stores therein accordingly the various types of input information obtained by analyzing the received signals obtained from the devices in the fitting computation processing system 100.

The information communication interface 13 connects the processing unit 11 and the devices electrically connected to the control device 10 such that mutual information communication can be made. The information communication interface 13 receives, from the shape measurement device 20, the material-to-be-repaired shape measurement data 101 and the repair patch shape measurement data 102 that are acquired by the shape measurement device 20, and transmits them to the processing unit 11. The information communication interface 13 receives, from the input device 30, the various types of information received as the input from the input device 30, and transmits them to the processing unit 11.

The information communication interface 13 receives, from the processing unit 11, the various types of information generated by the processing unit 11, such as the control signals for controlling the shape measurement device 20, the input device 30, and the output device 40, and transmits corresponding types of information to the shape measurement device 20, the input device 30, and the output device 40.

The information communication interface 13 receives, from the processing unit 11, the output information that is generated by the processing unit 11 and obtained as the results of the various computation processing related to the step of processing fitting computation S13 based on the fitting method according to the embodiment, and transmits the received output information to the output device 40.

The step of measuring shape of material to be repaired S21 measures the shape of the material to be repaired 1 and acquires the material-to-be-repaired shape measurement data 101. Specifically, at the step of measuring shape of material to be repaired S21, the material to be repaired 1 is placed in the measurement space in the shape measurement device 20, and the shape measurement unit 14 controls the shape measurement device 20 such that the shape measurement device 20 measures the shape of the material to be repaired 1, the shape including the shape of the adhesive surface 1a of the material to be repaired 1, and acquires the material-to-be-repaired shape measurement data 101 via the information communication interface 13.

The step of measuring shape of repair patch S22 measures the shape of the repair patch 2 and acquires the repair patch shape measurement data 102. Specifically, at the step of measuring shape of repair patch S22, the repair patch 2 is placed in the measurement space in the shape measurement device 20, and the shape measurement unit 14 controls the shape measurement device 20 such that the shape measurement device 20 measures the shape of the repair patch 2, the shape including the shape of the adhesive surface 2a of the repair patch 2, and acquires the repair patch shape measurement data 102 via the information communication interface 13.

Figure 4:
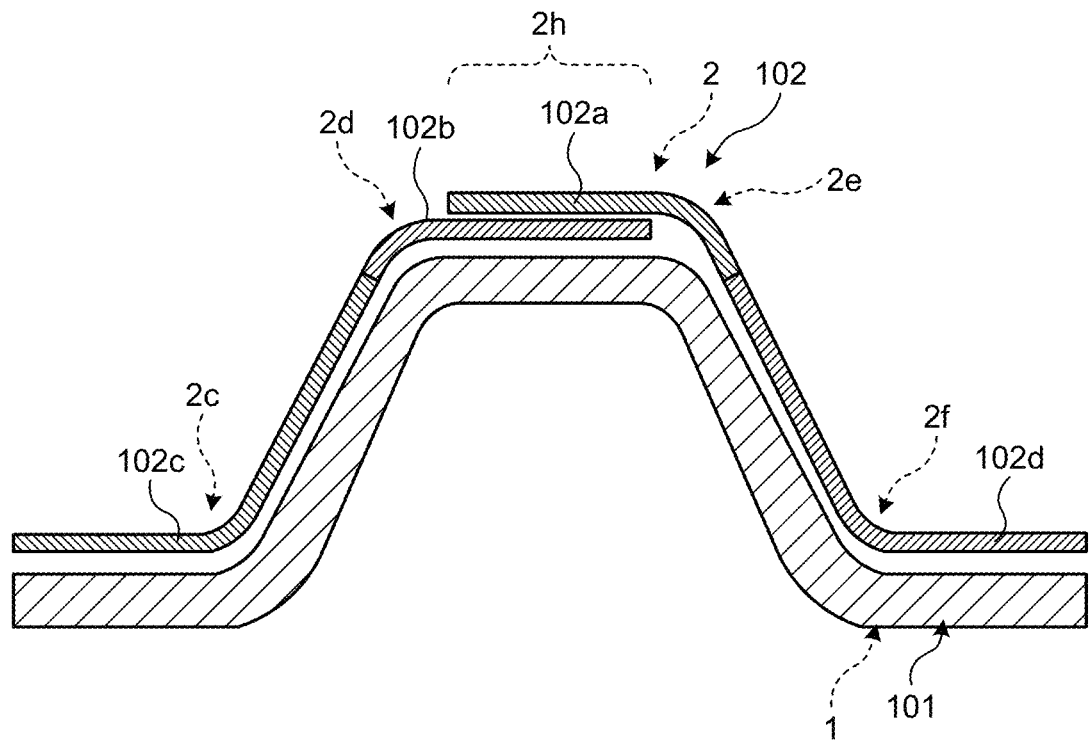
FIG. 4 is a schematic cross-sectional view explaining a step of dividing repair patch shape measurement data in FIG. 1.

FIG. 4 is a schematic cross-sectional view explaining the step of dividing repair patch shape measurement data S23 in FIG. 1. As illustrated in FIG. 4, at the step of dividing repair patch shape measurement data S23, the shape measurement data division processing unit 15 divides the repair patch shape measurement data 102 acquired at the step of measuring shape of repair patch S22 into a plurality of pieces of divided data 102a, 102b, 102c, and 102d each having one or less of the curved portions corresponding to the curved portions 2c, 2d, 2e, and 2f.

Specifically, at the step of dividing repair patch shape measurement data S23, in the present embodiment, the shape measurement data division processing unit 15 divides the repair patch shape measurement data 102 into four pieces of divided data, i.e., the divided data 102a including the curved portion corresponding to the curved portion 2e, the divided data 102b including the curved portion corresponding to the curved portion 2d, the divided data 102c including the curved portion corresponding to the curved portion 2c, and the divided data 102d including the curved portion corresponding to the curved portion 2f. The step of dividing repair patch shape measurement data S23 is not limited to the division form described above. Any division form may be acceptable as long as the shape measurement data division processing unit 15 divides the repair patch shape measurement data 102 into a plurality of pieces of divided data such that each curved portion is completely included in one of the pieces of divided data and any divided data does not include two or more of the curved portions.

At the step of dividing repair patch shape measurement data S23, the shape measurement data division processing unit 15 divides the repair patch shape measurement data 102 into a plurality of pieces of divided data such that each curved portion is completely included in one of the pieces of divided data, thereby making it possible to more accurately reproduce various properties related to elastic deformation of the shape of the repair patch 2 due to the curved portions to perform computation processing at the step of fitting S24, which is described later.

At the step of dividing repair patch shape measurement data S23, the shape measurement data division processing unit 15 divides the repair patch shape measurement data 102 into a plurality of pieces of divided data such that any divided data does not include two or more of the curved portions. This makes it possible to appropriately avoid the penetration phenomenon occurring at the step of fitting S24, which is described later, because the repair patch shape measurement data 102 includes the multiple curved portions.

At the step of dividing repair patch shape measurement data S23, the shape measurement data division processing unit 15 may divide the repair patch shape measurement data 102 into at least the same number of pieces of divided data as the number of curved portions. The planar portions excluding the curved portions each may be included in the divided data including the curved portion adjacent to the planar portion. The planar portions are, specifically, the planar portion corresponding to the planar portion on the left side of the curved portion 2c in FIG. 4, the planar portion corresponding to the planar portion between the curved portions 2c and 2d, the planar portion corresponding to the planar portion between the curved portions 2d and 2e, the planar portion corresponding to the planar portion between the curved portions 2e and 2f, and the planar portion corresponding to the planar portion on the right side of the curved portion 2f in FIG. 4. The pieces of divided data each may include only the planar portion including no curved portion. At the step of dividing repair patch shape measurement data S23, the shape measurement data division processing unit 15 can determine the distribution of the planar portions to the pieces of divided data as appropriate within a range where the various properties related to the elastic deformation of the shape of the repair patch 2 due to the curved portions can be accurately reproduced and the penetration phenomenon occurring due to the included multiple curved portions can be appropriately avoided.

At the step of dividing repair patch shape measurement data S23, the shape measurement data division processing unit 15 preferably determines such that the divided data 102a and 102b share the planar portion corresponding to the major fitting planar portion 2h where the material to be repaired 1 and the repair patch 2 are actually fitted with a gap amount equal to or smaller than a certain amount. At the step of fitting S24, which is described later, the deformation of the shape of the repair patch 2 is reflected at the boundary portions of the pieces of divided data 102a, 102b, 102c, and 102d divided by the shape measurement data division processing unit 15. As described above, the divided data 102a and 102b share the major fitting planar portion 2h, thereby making it possible to suitably avoid the deformation of the shape of the repair patch 2 from being reflected at the planar portion corresponding to the major fitting planar portion 2h where the deformation of the shape of the repair patch 2 actually rarely occurs.

At the step of dividing repair patch shape measurement data S23, the shape measurement data division processing unit 15 may divide the repair patch shape measurement data 102 into the divided data 102a, 102b, 102c, and 102d based on the various types of information about the division of the repair patch shape measurement data 102, the information having been received from the input device 30 via the information communication interface 13, or may divide the repair patch shape measurement data 102 into the divided data 102a, 102b, 102c, and 102d based on the various types of information about the division of the repair patch shape measurement data 102, the information having been preliminarily stored in the storage unit 12.

At the step of fitting S24, the fitting processing unit 16 performs the fitting processing on the pieces of divided data 102a, 102b, 102c, and 102d acquired at the step of dividing repair patch shape measurement data S23 with respect to the material-to-be-repaired shape measurement data 101 acquired at the step of measuring shape of material to be repaired S21 at the adhesive surfaces corresponding to the adhesive surfaces 1a and 2a. At the step of fitting S24, the fitting processing unit 16 can suitably use a known simulation program related to the fitting computation processing, for example.

At the step of fitting S24, the fitting processing unit 16 performs the fitting computation processing by reflecting the deformation of the shape of the repair patch 2 at the boundary portions of the divided data 102a, 102b, 102c, and 102d, thereby making it possible to perform fitting by tracing the actual deformation of the shape of the repair patch 2. At the step of fitting S24, the fitting processing unit 16 performs the fitting processing on the divided data 102a, 102b, 102c, and 102d at the adhesive surfaces corresponding to the adhesive surfaces 1a and 2a, resulting in repair patch shape fitting data 103 being acquired.

Figure 5:
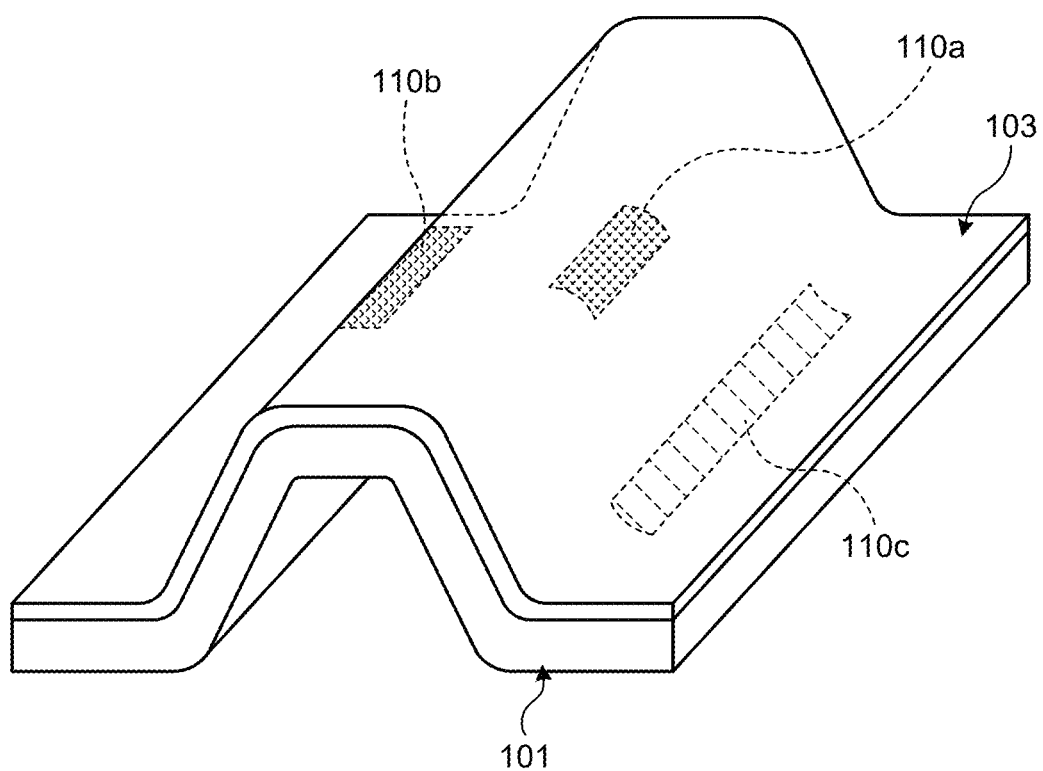
FIG. 5 is a schematic perspective view explaining a step of calculating gap amount and a step of calculating adhesive addition amount in FIG. 1.
Figure 6:
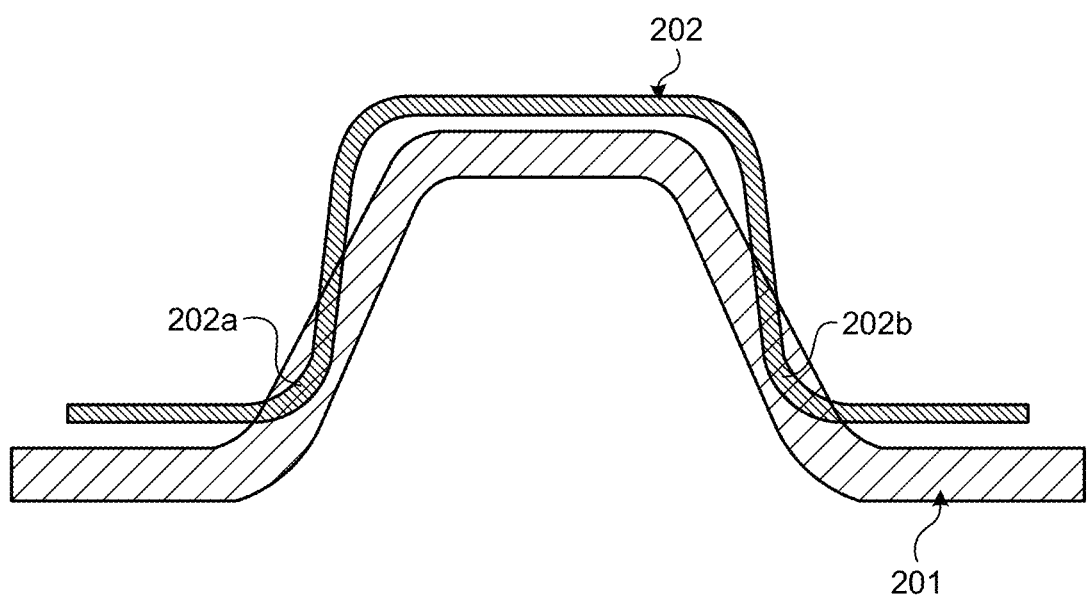
FIG. 6 is a schematic cross-sectional view illustrating an example when material-to-be-repaired shape measurement data and repair patch shape measurement data according to a conventional technique are fitted at adhesive surfaces.

FIG. 5 is a schematic perspective view explaining the step of calculating gap amount S25 and the step of calculating adhesive addition amount S26 in FIG. 1. As illustrated in FIG. 5, regions 110a and 110b are regions where the gap amount, at the adhesive surfaces corresponding to the adhesive surfaces 1a and 2a between the material-to-be-repaired shape measurement data 101 and the repair patch shape fitting data 103 obtained by performing the fitting processing at the step of fitting S24, is equal to or larger than 1.5t and smaller than 2.5t. As illustrated in FIG. 5, a region 110c is a region where the gap amount, at the adhesive surfaces corresponding to the adhesive surfaces 1a and 2a between the material-to-be-repaired shape measurement data 101 and the repair patch shape fitting data 103, is equal to or larger than 0.5t and smaller than 1.5t. The other region is a region where the gap amount, at the adhesive surfaces corresponding to the adhesive surfaces 1a and 2a between the material-to-be-repaired shape measurement data 101 and the repair patch shape fitting data 103, is smaller than 0.5t.

At the step of calculating gap amount S25, the gap amount calculation unit 17 calculates the gap amount at the adhesive surfaces corresponding to the adhesive surfaces 1a and 2a between the material-to-be-repaired shape measurement data 101 and the repair patch shape fitting data 103 obtained by performing the fitting processing at the step of fitting S24. Specifically, at the step of calculating gap amount S25, the gap amount calculation unit 17 calculates a separation distance, in the direction perpendicular to the adhesive surfaces, between the material-to-be-repaired shape measurement data 101 and the repair patch shape fitting data 103 for each of the coordinates on the adhesive surfaces corresponding to the adhesive surfaces 1a and 2a using the material-to-be-repaired shape measurement data 101 and the repair patch shape fitting data 103.

At the step of calculating gap amount S25, the information about the gap amount calculated by the gap amount calculation unit 17 for each of the coordinates on the adhesive surfaces corresponding to the adhesive surfaces 1a and 2a can be imaged as illustrated in FIG. 5, and the image can be transmitted to the output device 40 via the information communication interface 13 to cause the output device 40 to display the image, for example. At the step of calculating gap amount S25, as illustrated in FIG. 5, the gap amount calculation unit 17 allows the regions 110a and 110b where the gap amount is equal to or larger than 1.5t and smaller than 2.5t to be strongly highlighted and the region 110c where the gap amount is equal to or larger than 0.5t and smaller than 1.5t to be ordinarily highlighted, so as to be displayed on the output device 40, thereby visualizing the regions where the gap amount is large in a stepwise manner.

At the step of calculating gap amount S25, the embodiment is not limited thereto, but the gap amount calculation unit 17 preferably sets one or a plurality of thresholds related to the gap amount based on the various types of information received as the input from the input device 30 via the information communication interface 13 or the various types of information preliminarily stored in the storage unit 12, and evaluates the gap amount in a stepwise manner on the basis whether the calculated gap amount at each of the coordinates is equal to or larger than the threshold or smaller than the threshold, and visualize the gap amount in a stepwise manner.

At the step of calculating adhesive addition amount S26, the adhesive addition amount calculation unit 18 calculates an additional amount of the adhesive additionally disposed on the adhesive surface based on the gap amount calculated at the step of calculating gap amount S25. Specifically, at the step of calculating adhesive addition amount S26, the adhesive addition amount calculation unit 18 calculates the additional amount of the adhesive based on the various types of information about the used adhesive received as the input from the input device 30 via the information communication interface 13 or the various types of information about the used adhesive preliminarily stored in the storage unit 12.

For example, at the step of calculating adhesive addition amount S26, when the additional amount of the adhesive is calculated based on the information that the used adhesive is an adhesive sheet having a thickness of t, the adhesive addition amount calculation unit 18 calculates that one piece of the adhesive sheet needs to be added to the region 110c where the calculated gap amount is equal to or larger than 0.5t and smaller than 1.5t, while the adhesive addition amount calculation unit 18 calculates that two pieces of the adhesive sheets need to be added to the regions 110a and 110b where the calculated gap amount is equal to or larger than 1.5t and smaller than 2.5t. At the step of calculating adhesive addition amount S26, the adhesive addition amount calculation unit 18 causes the output device 40 to display, with image display illustrated in FIG. 5, the indication that one piece of the adhesive sheet needs to be added to the region 110c that is ordinarily highlighted and the indication that two pieces of the adhesive sheets need to be added to the regions 110a and 110b that are strongly highlighted, thereby making it possible to visualize regions requiring addition of the adhesive sheet and the additional amount.

At the step of calculating adhesive addition amount S26, the embodiment is not limited thereto, but The adhesive addition amount calculation unit 18 preferably sets one or a plurality of thresholds related to the gap amount based on the various types of information received as the input from the input device 30 via the information communication interface 13 or the various types of information preliminarily stored in the storage unit 12, evaluates the gap amount in a stepwise manner on the basis whether the calculated gap amount at each of the coordinates is equal to or larger than the threshold or smaller than the threshold, and converts the step corresponding to the gap amount into the additional amount of the adhesive.

At the step of adhesively bonding repair patch S14, the repair patch 2 is adhesively bonded to the material to be repaired 1 based on the gap amount calculated at the step of processing fitting computation S13. The expression that the repair patch 2 is adhesively bonded to the material to be repaired 1 based on the gap amount calculated at the step of processing fitting computation S13 also includes the meaning that the adhesive bonding is done based on the additional amount of the adhesive calculated based on the gap amount besides the meaning that the adhesive bonding is done based on simply the gap amount.

Specifically, at the step of adhesively bonding repair patch S14, in the present embodiment, one piece of the adhesive sheet having a thickness of t is put on the whole surface of the adhesive surface 1a of the material to be repaired 1, the adhesive sheet having a thickness of t is additionally put on the region where the additional amount of the adhesive is equal to or larger than one based on the additional amount of the adhesive calculated at the step of calculating adhesive addition amount S26, the repair patch 2 is placed such that the adhesive surface 2a faces the put adhesive, the adhesive sheet is heated while the material to be repaired 1 and the repair patch 2 are pressed such that the adhesive surfaces 1a and 2a face each other to cause adhesive reaction to occur in the adhesive sheet, resulting in the adhesive surface 2a of the repair patch 2 being adhesively bonded to the adhesive surface 1a of the material to be repaired 1.

At the step of adhesively bonding repair patch S14, the repair patch 2 is adhesively bonded to the material to be repaired 1 while being elastically deformed by a certain degree of applied force, so as to be deformed according to the fitting computation processing performed at the step of fitting S24, resulting in the gap having the gap amount calculated at the step of calculating gap amount S25 being produced between the repair patch 2 and the material to be repaired 1. At the step of adhesively bonding repair patch S14, the produced gap amount is completely filled with the adhesive added according to the gap amount.

The fitting method and the repair method according to the embodiment of the present invention have the configuration described above, and the repair patch shape measurement data 102 that is fitted to the material-to-be-repaired shape measurement data 101 at the adhesive surfaces corresponding to the adhesive surfaces 1a and 2a is divided into the pieces of divided data 102a, 102b, 102c, and 102d each including one or less of the curved portions, thereby increasing a degree of freedom of fitting and making it possible to reduce possibility of the occurrence of the penetration phenomenon occurring when two or more of the curved portions are included. The fitting method and the repair method according to the embodiment of the present invention can normally fit the material to be repaired 1 and the repair patch 2 at the adhesive surfaces 1a and 2a even when the adhesive surface 1a of the material to be repaired 1 and the adhesive surface 2a of the repair patch 2 each have at least two or more of the curved portions.

In the fitting method and the repair method according to the embodiment of the present invention, at the step of dividing repair patch shape measurement data S23, the two pieces of divided data 102a and 102b share the planar portion corresponding to the major fitting planar portion 2h where the material to be repaired 1 and the repair patch 2 are actually fitted with a gap amount equal to or smaller than a certain amount. The fitting method and the repair method according to the embodiment of the present invention can perform fitting of the material to be repaired 1 and the repair patch 2 at the adhesive surfaces 1a and 2a with a high accuracy in accordance with the actual system.

The fitting method and the repair method according to the embodiment of the invention further has the step of calculating adhesive addition amount S26 that calculates the additional amount of the adhesive to be additionally disposed on the adhesive surfaces 1a and 2a based on the gap amount calculated at the step of calculating gap amount S25. The fitting method and the repair method according to the embodiment of the present invention can suitably obtain the information about the additional amount of the adhesive directly necessary for repairing of the material to be repaired 1 performed by actually adhesively bonding the repair patch 2 to the material to be repaired 1.

REFERENCE SIGNS LIST 1 material to be repaired
1a, 2a adhesive surface
2 repair patch
2c, 2d, 2e, 2f curved portion
2h major fitting planar portion
10 control device
11 processing unit
12 storage unit
13 information communication interface
14 shape measurement unit
15 shape measurement data division processing unit
16 fitting processing unit
17 gap amount calculation unit
18 adhesive addition amount calculation unit
20 shape measurement device 30 input device
40 output device
100 fitting computation processing system
101 material-to-be-repaired shape measurement data
102 repair patch shape measurement data
102a, 102b, 102c, 102d divided data
103 repair patch shape fitting data
110a, 110b, 110c region
201 material-to-be-repaired shape measurement data
202 repair patch shape measurement data
202a, 202b portion

The invention claimed is:

1. A fitting method for fitting a material to be repaired and a repair patch to be adhesively bonded to the material to be repaired at adhesive surfaces where the material to be repaired and the repair patch are adhesively bonded, each adhesive surface having at least two or more of curved portions, the fitting method comprising:
measuring a shape of the material to be repaired;
measuring a shape of the repair patch;
dividing repair patch shape measurement data acquired at measuring the shape of repair patch into a plurality of pieces of divided data each including one or less of the curved portions;
performing, at the adhesive surfaces, fitting processing of the pieces of divided data acquired at dividing the repair patch shape measurement data to material-to-be-repaired shape measurement data acquired at measuring the shape of material to be repaired; and
calculating a gap amount between the material-to-be-repaired shape measurement data and repair patch shape fitting data acquired from the fitting processing at the adhesive surfaces.

2. The fitting method according to claim 1, wherein, at dividing the repair patch shape measurement data, two pieces of the divided data share a major fitting planar portion that is a planar portion where the material to be repaired and the repair patch are actually fitted with the gap amount equal to or smaller than a certain amount.

3. The fitting method according to claim 1, further comprising calculating an additional amount of an adhesive additionally disposed on the adhesive surfaces based on the calculated gap amount.

4. A repair method for repairing a material to be repaired by adhesively bonding a repair patch to the material to be repaired, the repair method comprising:
machining an adhesive surface of the material to be repaired;
forming the repair patch to coincide with the adhesive surface of the material to be repaired;
processing fitting computation based on the fitting method according to claim 1; and
adhesively bonding the repair patch to the material to be repaired based on the gap amount calculated at the fitting computation.

* * * * *